US005142925A

United States Patent [19]

Fauvel

[11] Patent Number: 5,142,925

[45] Date of Patent: Sep. 1, 1992

[54] DEVICE FOR ANIMATING MOVABLE PARTS

[75] Inventor: Henri Fauvel, Ecully, France

[73] Assignee: Euretal PLV, Bischheim, France

[21] Appl. No.: 645,691

[22] Filed: Jan. 25, 1991

[30] Foreign Application Priority Data

Jan. 25, 1990 [FR] France .............................. 90 01570

[51] Int. Cl.5 ...................... F16H 21/28; G09F 19/02

[52] U.S. Cl. .......................................... 74/54; 40/423

[58] Field of Search ...................... 74/54; 40/423, 429, 40/472; 403/348, 349, 289, 354; 384/296

[56] References Cited

U.S. PATENT DOCUMENTS

| | | | |
|---|---|---|---|
| 1,100,504 | 6/1914 | Taft | 403/354 X |
| 1,764,834 | 7/1929 | Gatliff . | |
| 2,146,192 | 10/1938 | Kraemer | 40/34 |
| 2,274,265 | 2/1942 | Chandler et al. | 74/54 X |
| 2,644,884 | 7/1953 | Sullivan | 74/54 X |
| 2,692,509 | 10/1954 | Gibson | 74/54 X |
| 3,141,432 | 7/1964 | Reeber et al. | 74/54 X |
| 3,611,510 | 10/1971 | Bennett et al. | 403/354 |
| 4,497,141 | 2/1985 | Jarby | 403/348 X |
| 4,893,978 | 1/1990 | Frano | 403/348 X |

FOREIGN PATENT DOCUMENTS 510272 10/1930 Fed. Rep. of Germany .

*Primary Examiner*—Allan D. Herrmann
*Assistant Examiner*—Julie Krolikowski
*Attorney, Agent, or Firm*—Oliff & Berridge

[57] ABSTRACT

A disk driven rotationally by an electric motor includes a cam-shaped groove and a shaft orthogonal to the plane of the disk. One end of the shaft bears a radial arm connected rotationally to the shaft, and fitted with a pin designed to engage the groove. The other end of said shaft is connected directly or indirectly with one or several movable parts to be animated.

8 Claims, 3 Drawing Sheets

DEVICE FOR ANIMATING MOVABLE PARTS

FIELD OF THE INVENTION

The present invention relates to a device for animating movable parts.

BACKGROUND OF THE INVENTION

It is known that figures can be cut from a sheet of stiff cardboard and used as decorative or advertising panels designed to be set up at points of sale such as store windows, show booths, etc.

To make these figures or panels more attractive, they can be animated by one or more movable parts actuated by an electric motor acting on a drive connected to said parts. At present, models of this type include complicated motors and drive systems that are difficult to make and assemble, are costly to manufacture, and cannot be adjusted, making them unusable for advertising panels that must be changed frequently.

SUMMARY OF THE INVENTION

The present invention seeks to overcome these disadvantages by providing a device for animating movable parts, especially figures or advertising panels, that are very simple to manufacture, assemble, and take down, and in particular, are inexpensive.

To this end, this device comprises a disk rotated by an electric motor, comprising a cam-shaped groove and a shaft orthogonal to the plane of said disk, one end of said shaft bearing a radial arm rotationally linked thereto and provided with a pin designed to engage said groove, the other end of said shaft being connected, directly or indirectly, with one or more movable parts to be animated.

Rotation of the disk and the groove that it comprises moves the pin and radial arm, causing oscillating pivoting of the shaft. These parts create an alternating motion that allows the movable part to be animated, using a continuously operating motor that is very simple, sturdy, and cheap. Various movements of the movable parts such as movements at variable speed during a cycle can be obtained as needed, simply by using disks having grooves of different shapes.

Preferably, the disk as well as the pin, arm, and shaft are made of a synthetic, molded, self-lubricating material such as graphited nylon or the material known by the trade name of Derlin.

Advantageously, the motor and disk are supported by a supporting board or plate, and the shaft is engaged in a tubular bearing integral with the plate.

The tubular bearing has at its end facing the plate, two pins extending radially and diametrally opposed, and a flange located at a distance from the above pins that is essentially equal to the thickness of the plate, the latter comprising a hole matching the diameter of the bearing, extended by two cuts matching the pins.

Making the plate and tubular bearing of two different parts makes it possible to lower the cost of the device and especially that of the molds, the plate and bearing preferably being made of plastic. The bearing is easily attached to the plate by fitting it and the pins into the above-described hole until the flange touches the plate, then rotating it a quarter turn to lock it.

According to a preferred embodiment of the device, the shaft and its radial arm are molded in one piece, and the free end of the shaft, which has a square cross section, is extended by two parallel fingers each of which is equipped on its outward facing wall with a tooth allowing engagement of a drive element acting on the movable part.

The engagement permits different drive means to be adapted quickly and easily to the device depending on the movements to be created.

In one possible design, one end of a rod is attached to the free end of the shaft, the other end of said rod being articulated to a bar integral with the movable part to be animated, said bar being engaged in a guide track in which it is retained in a removable fashion by engaging a rib with which it is provided, the free edge of said rib being provided with a bead and designed to engage a matching hole provided in the track.

Because of the play between the rod and bar, the alternating motion of the shaft driven by the rotation of the disk comprising the cam-shaped groove drives the movable part with an alternating translational motion. The movable part supported by the bar can easily be interchanged as required, by pulling the bar off the track, said retraction being made possible by an engagement assembly.

According to another design, the free end of the shaft is connected to a disk integral with the movable part to be animated. The motion animating the movable part is then an alternating pivoting motion.

Preferably, the tubular bearing is provided at the end located near the free end of the shaft, with two pins projecting radially and diametrally opposite one another, designed to cooperate with a locking element comprising a hole matching the diameter of the bearing, extended by two cuts matching the pins.

Thus, the end of the bearing can be fitted through a hole in one of the parts of the figure or panel, then through the hole provided in the locking part which, after being rotated a quarter turn, attaches the device to the part of the figure or panel.

Advantageously, the face of the disk opposite the one comprising the cam-shaped groove is provided with an eccentric crank pin on which a drive element connected to another movable part is articulated.

It is therefore possible to animate several movable parts with a single device.

In any event, the invention will be clearly understood from the following description with reference to the attached schematic diagram showing as nonlimiting examples, two preferred embodiments of the device according to the invention.

DESCRIPTION OF THE PREFERRED EMBODIMENT

Figure 1:
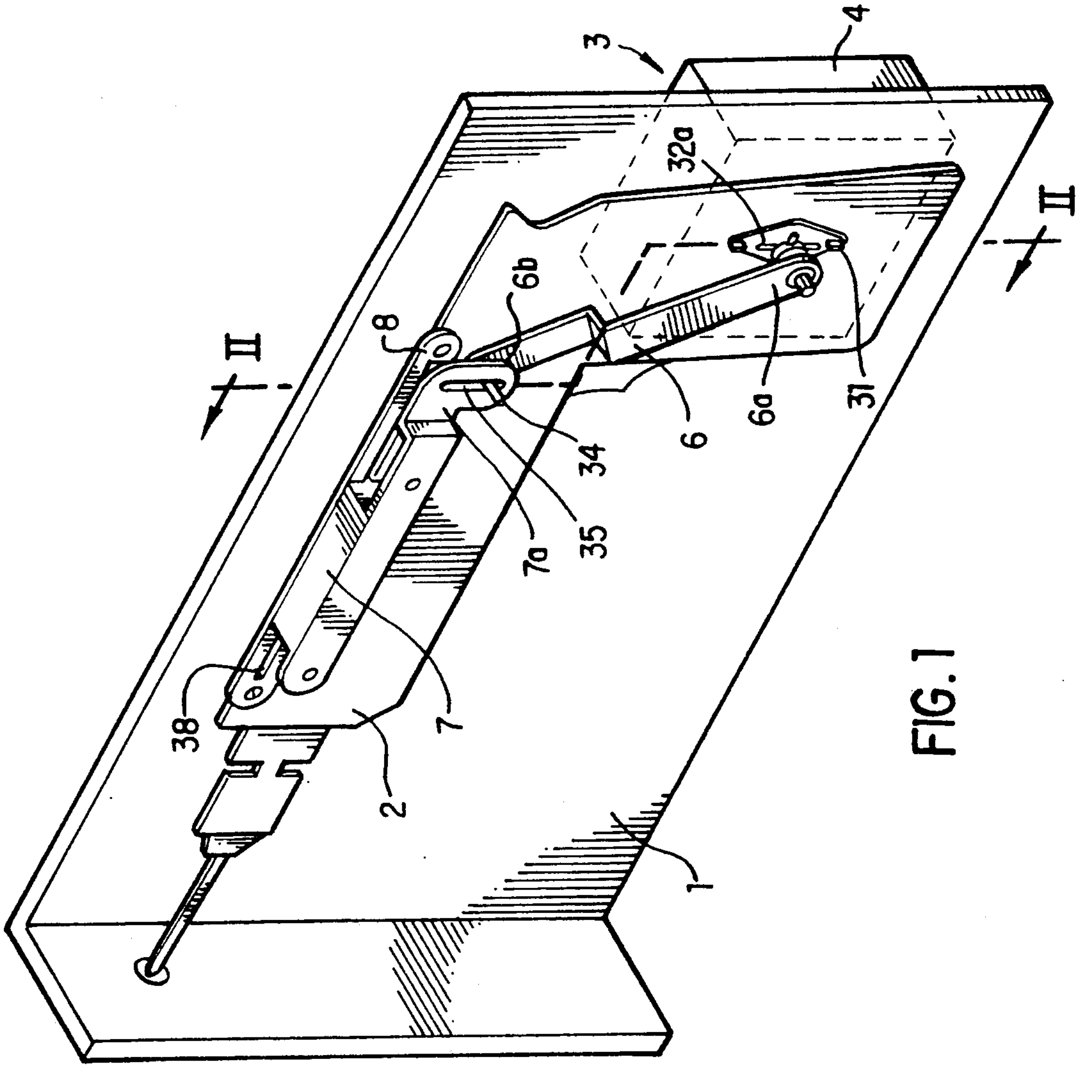
FIG. 1 is a perspective view of an advertising panel embodying the invention.
Figure 2:
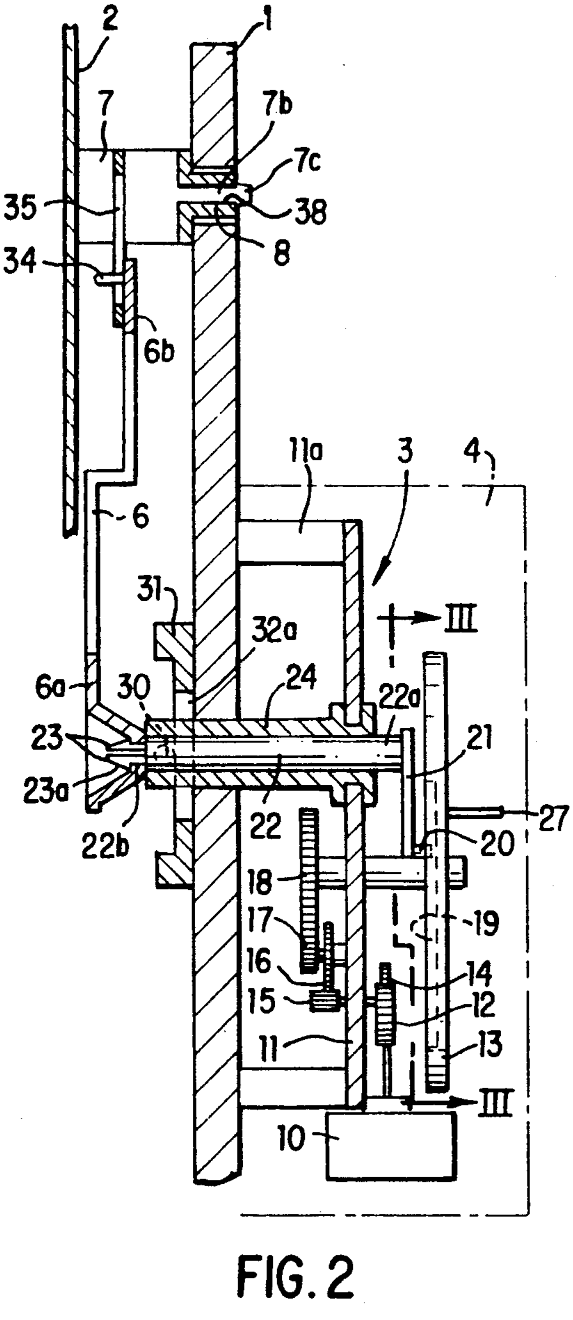
FIG. 2 is a section along II—II in FIG. 2.

FIGS. 1 and 2 show from different angles an advertising panel 1 comprising a movable part 2 in the shape of an electric drill animated by device 3 according to the invention. Device 3 is located on the rear face of panel 1, and is protected by a housing 4. Device 3 animates movable part 2 through drive means composed of a rod 6, a bar 7 integral with movable part 2, and a guide track 8.

Device 3 comprises an electric motor 10 supported by a support plate 11 comprising tabs 11*a*, equipped with an endless screw 12 which causes axial rotation of disk 13 through a train of reducing gears 14, 15, 16, 17, and 18.

Figure 3:
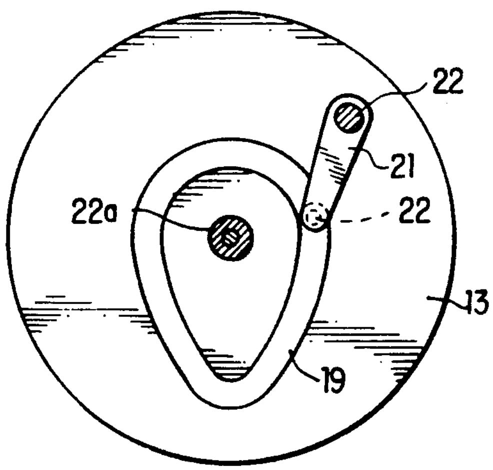
FIG. 3 is a section along III—III in FIG. 1.

A look at FIGS. 2 and 3 shows that disk 13 comprises a groove 19 in the shape of a cam receiving a pin 20 supported by a radial arm 21 located at one end 22*a* of a shaft 22 rotationally linked thereto. Disk 13 also has a crank pin 27 on the face opposite that provided with groove 19. One end 6*a* of rod 6 is fastened to the other end 22*b* of shaft 22, with end 22*b* having a square cross section and being extended by two parallel fingers 23, each of which is provided on its outward facing wall with a tooth 23*a* allowing engagement of end 6*a* of rod 6 in the matching hole which it comprises.

Figure 4:
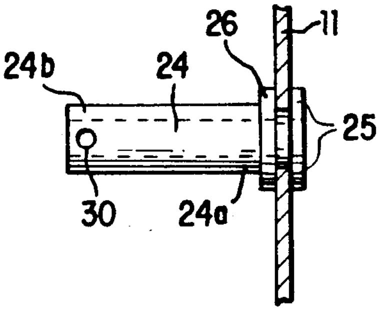
FIG. 4 is a side view of a tubular bearing in accordance with the invention.
Figure 5:
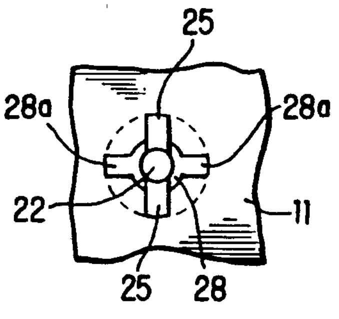
FIG. 5 is an end view of the bearing of FIG. 4.

Shaft 22 is engaged in tubular bearing 24. FIGS. 2, 4, and 5 show that bearing 24 is mounted on plate 11 by one of its ends 24*a* which comprises two pins 25 projecting radially and diametrally opposite, and a flange 26 located at a distance from pins 25 that is essentially equal to the thickness of plate 11, the latter comprising a hole 28 matching the diameter of bearing 24 extended by two cuts 28*a* matching pins 25.

In practice, end 24*a* of bearing 24 and pins 25 are engaged in hole 28 and cuts 28*a* until flange 26 meets plate 11. Rotating bearing 24 a quarter turn locks it to plate 11 (FIG. 5).

In addition, end 24*b* of bearing 24 opposite end 24*a* is equipped with two pins 30 projecting radially and diametrally opposite, designed to cooperate with a locking element 31 comprising a hole 32 matching the diameter of bearing 24 extended by two cuts 32*a*.

In the same way as described above, rotating part 31 a quarter turn mounts device 3 on panel 1.

It is evident from FIGS. 1 and 2 that rod 6 is equipped at its end 6*b* opposite end 6*a* with a finger 34 extending perpendicularly, engaged in a hole 35 provided in one end 7*a* of bar 7. The latter comprises a rib 7*b* whose free edge comprises a bead 7*c* that fits in a hole 38 provided in track 8.

Panel 1, movable part 2, and housing 4 are made of cardboard. Disk 13, as well as the assembly composed of shaft 22, arm 21, and pin 20 are made of graphited nylon, the assembly composed of shaft 22, arm 21, and pin 20 being molded in one piece. The other parts, except for motor 10, are made of plastic.

The invention operates as follows:

Rotation of disk 13 and groove 19 moves pin 20 and arm 21, causing oscillating pivoting of shaft 22. Rod 6 actuates bar 7 which moves on track 8 with an alternating translational motion.

The design of ends 24*a* and 24*b* of bearing 24 and matching holes 28, 28*a*, 32, 32*a* allows the device to be assembled rapidly. The removable engagement of end 6*a* of rod 6 on fingers 23 and that of bar 7 in slot 38 permits drive elements 6 and 7 to be interchanged and to perform different movements, or to replace movable part 2. Different movements can be obtained by using disks with grooves of different shapes. Crank pin 27 can be connected to auxiliary drive elements that can produce secondary animation.

Figure 6:
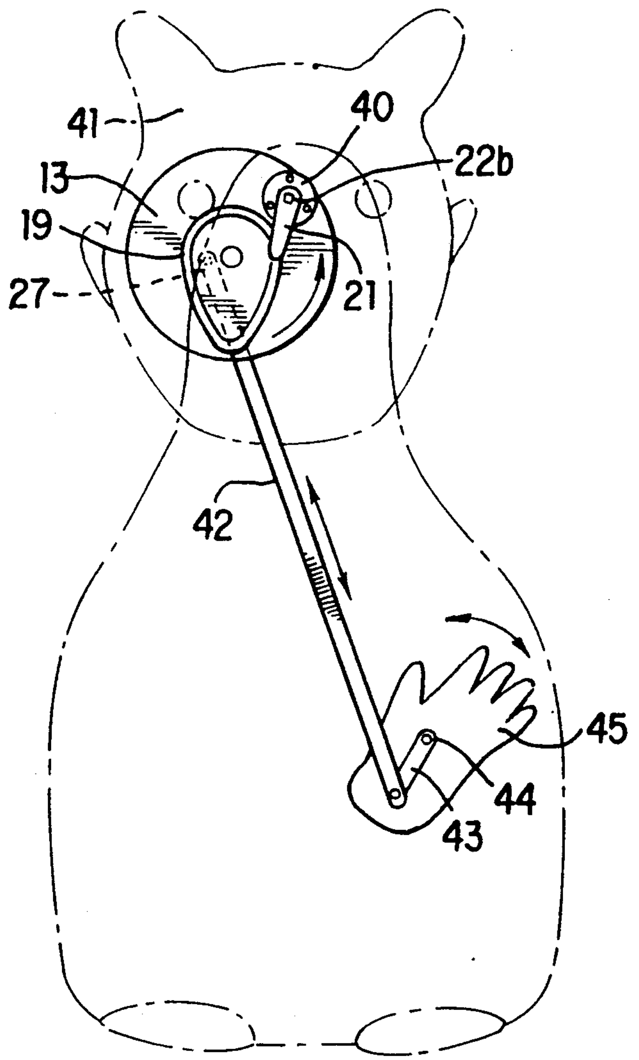
FIG. 6 is a view of a figure equipped with the device according to the invention.

FIG. 6 shows a second embodiment of a figure equipped with device 3. The elements identical to those described earlier have the same reference numbers. End 22*b* of shaft 22 is connected to a disk 40 locked to it, said disk 40 being integral with a movable part 41 of the figure. Crank pin 27 is mounted on disk 13 and is articulated to one end of a rod 42 whose other end is articulated to one end of a rod 43 rotationally integral with an auxiliary shaft 44, itself integral with a movable part 45 of the figure.

What is claimed is:

1. Device for animating a movable part comprising: a disk rotated by a motor; said disk having a groove in the shape of a cam, a shaft orthogonal to the plane of said disk, a radial arm mounted on one end of said shaft, the radial arm being rotatable with the shaft, a pin mounted on the radial arm for engaging said groove, drive means for connecting the free end of said shaft opposite to the end on which the radial arm is mounted to the movable part to be animated;

a support plate;

a tubular bearing; and means for mounting the tubular bearing on the support plate;

wherein the motor and the disk are supported by the support plate and the shaft is received in said tubular bearing.

2. A device according to claim 1, wherein the disk, pin, arm and shaft are made of a self-lubricating molded synthetic material.

3. Device according to claim 1, wherein a face of the disk opposite the cam-shaped groove includes an eccentric crank pin, a drive element connected to the crank pin, a second movable part and means connecting said drive element to said second movable part.

4. A device according to claim 1, wherein the tubular bearing comprises at its end facing the plate, two pins projecting radially and diametrally opposed, and a flange located at a distance from the pins essentially equal to the thickness of the support plate, the plate including a hole matching the diameter of bearing, said hole being extended by two cuts matching said pins.

5. A device for animating a movable part comprising:

a disk rotated by a motor;

said disk having a groove in the shape of a cam, and a shaft orthogonal to the plane of said disk, a radial arm mounted on one end of said shaft, the radial arm being rotatable with the shaft, a pin mounted on the radial arm for engaging said groove, drive means for connecting the free end of said shaft opposite to the end on which the radial arm is mounted to the movable part to be animated, wherein the shaft and the radial arm are molded in one piece, and said free end of said shaft having a square cross section, said free end comprising two parallel fingers, each of said fingers having an exterior wall forming a portion of said square cross section, said square cross section permitting driving engagement with said drive means acting on said movable part.

6. A device for animating a movable part comprising:

a disk rotated by a motor;

said disk having a groove in the shape of a cam, and a shaft orthogonal to the plane of said disk, a radial arm mounted on one end of said shaft, said radial arm being rotatable with the shaft, a pin mounted on the radial arm for engaging said groove, drive means for connecting the free end of said shaft opposite to the end on which the radial arm is mounted to the movable part to be animated, a rod, one end of the rod being attached to the free end of shaft, the other end of said rod being articulated to a bar integral with the movable part to be animated; a guide track on the plate, said guide track having a slot, said bar being removably engaged in the guide track, said bar having a rib, said rib having a free edge, the free edge of said rib being provided with a bead for engaging the slot in the track.

7. A device according to claim 1, wherein the free end of the shaft is connected to a second disk, said second disk being mounted on said movable part to be animated.

8. A device according to claim 1, wherein the tubular bearing is provided at its end located near the free end of the shaft with two pins projecting radially and diametrally opposed; and further comprising a locking element, said locking element including a hole matching the diameter of the bearing and extended by two cuts matching said pins, said pins being arranged to cooperate with the locking element to hold the bearing on the plate.

* * * * *